United States Patent [19]

Shiokawa et al.

[11] Patent Number: 5,358,916
[45] Date of Patent: Oct. 25, 1994

[54] CATALYST FOR PURIFYING EXHAUST GAS

[75] Inventors: Kazuhiko Shiokawa; Takashi Itoh, both of Ichikawa, Japan

[73] Assignee: N.E. Chemcat Corporation, Tokyo, Japan

[21] Appl. No.: 62,196

[22] Filed: May 17, 1993

[30] Foreign Application Priority Data

Nov. 16, 1992 [JP] Japan .................................. 4-329973

[51] Int. Cl.$^5$ ........................ B01J 29/10; B01J 29/20
[52] U.S. Cl. ...................................... 502/65; 502/64; 502/66
[58] Field of Search ............................ 502/64, 65, 66; 423/239.2

[56] References Cited

U.S. PATENT DOCUMENTS

| | | | |
|---|---|---|---|
| 5,149,511 | 9/1992 | Montreuil et al. | 423/239.2 |
| 5,155,077 | 10/1992 | Montreuil et al. | 502/66 |
| 5,179,053 | 1/1993 | Subramanian et al. | 502/66 |

FOREIGN PATENT DOCUMENTS

| | | | |
|---|---|---|---|
| 0455491 | 11/1991 | European Pat. Off. | |
| 4128629 | 3/1993 | Fed. Rep. of Germany | |
| 3126560 | 5/1988 | Japan | 502/64 |
| 3-89943 | 4/1991 | Japan | 502/64 |
| 3-127629 | 5/1991 | Japan | 423/239.2 |

*Primary Examiner*—Carl F. Dees
*Attorney, Agent, or Firm*—Wenderoth, Lind & Ponack

[57] ABSTRACT

A catalyst for purifying exhaust gas, comprising a zeolite carrier having a mole ratio of $SiO_2/Al_2O_3$ of from 20 to 200, and a compound oxide of copper and silicon supported on the carrier. The catalyst has high activity for elimination of nitrogen oxides ($NO_x$) even in the presence of both oxygen and water vapor, and also has excellent durability at high temperatures. The catalyst is therefore effective in eliminating nitrogen oxides from exhaust gases from automobiles, boilers and the like.

10 Claims, No Drawings

CATALYST FOR PURIFYING EXHAUST GAS

BACKGROUND OF THE INVENTION

1. Field of the Invention

The present invention relates to a catalyst for purifying exhaust gases which is suitable for eliminating nitrogen oxides ($NO_x$) from exhaust gases from automobiles, boilers and the like.

2. Description of the Prior Art

For elimination of nitrogen oxides from exhaust gas, a number of methods have been known heretofore. The known methods include (1) a selective reduction method using ammonia in the presence of a $V_2O_5$—$TiO_2$ catalyst, (2) an automotive three-way catalyst method in which a Pt-Rh/$Al_2O_3$ catalyst is used, and (3) a direct decomposition method which uses a noble metal catalyst or metal oxide catalyst, such as Pt/$Al_2O_3$, $Co_3O_4$, $YBa_2Cu_3O_y$ and the like. These known methods, however, have respective drawbacks and are therefore unsatisfactory. That is, the method (1) involves difficulties as to cost and equipment because of the use of ammonia, whereas the catalysts used in the methods (2) and (3) can hardly catalyze the desired reactions for elimination of nitrogen oxides where the exhaust gas to be treated contains oxygen in excess of the stoichiometric quantity for the reaction system.

Recently, therefore, many research efforts have been made on copper ion-exchange zeolite catalysts capable of exhibiting relatively high activity even in the presence of excess oxygen. For example, there have been reports on a copper-transition metal co-ion-exchange zeolite catalyst (Japanese Pre-examination Patent Publication (KOKAI) No. 1-130735), a copper-noble metal co-ion-exchange zeolite catalyst (Japanese Pre-examination Patent Publication (KOKAI) No. 1-310742), a copper-rare earth co-ion-exchange zeolite catalyst (Japanese Pre-examination Patent Publication (KOKAI) No. 3-89942), and the like. These catalysts have a common feature that active metal components are supported on a carrier by an ion-exchange method, and it is reported that supporting the active metal components on the carrier by other method than ion-exchange results in a lowered activity.

Catalysts for purifying exhaust gas which are used to eliminate nitrogen oxides from exhaust gas are required to have high activity and high-temperature durability in the presence of both oxygen and water vapor. However, the copper co-ion-exchange zeolite catalysts, copper-noble metal co-ion-exchange zeolite catalysts, and copper-rare earth co-ion-exchange zeolite catalysts as described above have the drawback that, because the active metal components such as copper are supported on the carrier by an ion-exchange method, the principal active component element is supported only in a limited amount and, besides, stable supporting of copper on zeolite is not achieved. Accordingly, when these catalysts are exposed to high temperatures, aggregation of copper will occur, making it difficult to maintain sufficient activity. In particular, the presence of water vapor tends to cause further lowering in the activity of the catalysts. Due to the poor high-temperature durability in the presence of oxygen and water vapor, the copper ion-exchange zeolite catalysts have not yet been put to practical use.

SUMMARY OF THE INVENTION

It is accordingly an object of the present invention to provide a catalyst for purifying exhaust gas which has high activity for elimination of nitrogen oxides and excellent durability at high temperatures, even in the presence of both oxygen and water vapor.

In order to attain the above object, the present invention provides a catalyst for purifying exhaust gas, comprising a zeolite carrier having a mole ratio of $SiO_2$/$Al_2O_3$ of from 20 to 200, and a compound oxide of copper and silicon supported on the carrier.

The present invention also provides, as one preferred embodiment thereof, a catalyst for purifying exhaust gas as above-described which further comprises at least one noble metal selected from the group consisting of Pt, Pd, Rh, Au and Ir.

The present invention further provides, as another preferred embodiment thereof, a catalyst for purifying exhaust gas as above-described wherein the compound oxide further contains at least one rare earth element selected from the group consisting of La, Ce, Ho and Y.

The catalyst for purifying exhaust gas according to the present invention, in comparison to the conventional catalysts for purifying exhaust gas, has higher activity for elimination of nitrogen oxides and superior durability at high temperatures, even in the presence of both oxygen and water vapor. Therefore, the catalyst according to the present invention is effective in eliminating nitrogen oxides coexistent with oxygen and water vapor in exhaust gases from automobiles, boilers and the like.

DETAILED DESCRIPTION OF PREFERRED EMBODIMENTS

The catalyst for purifying exhaust gas according to the present invention will now be described in detail below.

Compound oxide of copper and silicon

The catalyst according to the present invention comprises a compound oxide of copper and silicon. The catalyst of the present invention preferably comprises copper in an amount of from 1.0 to 15% by weight, more preferably from 2 to 10% by weight, as metallic copper, based on the whole catalyst. If the copper content is too low, catalytic activity is lowered, whereas too high of a copper content tends to lower both the catalyst activity for elimination of nitrogen oxides and the catalyst durability at high temperatures.

The catalyst according to the invention preferably comprises silicon in an amount of from 1.0 to 15% by weight, more preferably from 2.0 to 10% by weight, as metallic silicon, based on the whole catalyst. If the silicon content is too low, it is difficult for the compound oxide of copper and silicon to be supported stably on the zeolite carrier with high dispersion, and it is therefore difficult to obtain sufficient durability at high temperatures. Where the silicon content is too high, on the other hand, catalytic activity tends to be lowered conspicuously.

The compound oxide of copper and silicon in the catalyst according to the present invention is preferably used in an amount of from 2 to 30% by weight, more preferably from 4 to 20% by weight, in terms of the total amount of copper and silicon, based on the whole catalyst. In addition, the weight ratio of Cu/Si (on a metallic basis) in the compound oxide is preferably in the range from 0.1 to 5, more preferably from 0.2 to 3.

Noble metal component and/or rare earth component

The catalyst of the present invention, in one embodiment thereof, may comprise at least one noble metal element selected from the group consisting of Pt, Pd, Rh, Au and Ir, in addition to the compound oxide of copper and silicon. In another embodiment, the catalyst may comprise at least one rare earth element selected from the group consisting of La, Ce, Ho and Y, in addition to the compound oxide of copper and silicon. Addition of such noble metal or rare earth element(s) enhances further the catalytic activity and high-temperature durability of the catalyst according to the present invention.

Noble metal component

There are no special restrictions on the form of the noble metal which may be contained in the catalyst of the present invention. For example, the noble metal may be in a metallic state or in a state of oxide. Where the noble metal is present in an oxide state, the metal may or may not form a compound oxide with copper and silicon. Among the applicable forms of the noble metal, preferred is one in which the noble metal in the metallic state is highly dispersed in the compound oxide of copper and silicon.

The amount of the noble metal component, is preferably from 0.05 to 5% by weight, more preferably from 0.2 to 3% by weight, as metal(s), based on the whole catalyst. If the amount of the noble metal component is too small, the addition of the noble metal component does not produces the effect of improving further the catalytic activity and high-temperature durability of the catalyst. On the other hand, excessively large amounts tend to cause a marked lowering in the catalytic activity.

Rare earth component

The amount of the rare earth component which may be contained in the catalyst of the present invention is preferably from 0.05 to 10% by weight, more preferably from 0.2 to 5% by weight, as rare earth element(s), based on the whole catalyst. If the amount of the rare earth component is too small, the intended effect of further improving the catalytic activity and high-temperature durability of the catalyst is not obtained. On the other hand, too large amounts tend to lower conspicuously the catalytic activity.

The noble metal component and the rare earth component may be contained in combination in the catalyst.

It is estimated that where the noble metal component and/or rare earth component are contained in the catalyst of the present invention, in addition to copper and silicon, the noble metal(s) and/or rare earth element(s) might be incorporated into the compound oxide of copper and silicon, and be thereby supported stably in the pores of the zeolite carrier with high dispersion, leading to enhanced catalytic activity and high-temperature durability.

Zeolite carrier

As the carrier for forming the catalyst according to the present invention, a zeolite having a mole ratio of $SiO_2/Al_2O_3$ in the range from 20 to 200 can be used. If the $SiO_2/Al_2O_3$ mole ratio is less than 20, sufficient activity and sufficient high-temperature durability cannot be obtained with ease, whereas $SiO_2/Al_2O_3$ mole ratios in excess of 200 lead to lowered catalytic activity.

Any zeolite can be used as the carrier, provided the above-described conditions are fulfilled. Examples of the usable zeolites include ZSM-5 type zeolites synthesized according to U.S. Pat. No. 3,702,886, ZSM-11 type zeolites synthesized according to U.S. Pat. No. 3,709,979, mordenite, ferrierite, Y-type zeolites and the like, of which preferred are ZSM-5 type zeolites.

Process for preparation

The process for preparation of the catalyst of the present invention is not particularly restricted, with preferred examples of the process including the precipitation process and the sol-gel process as described below.

In these processes, various sources of metal can be used. For example, copper chloride, copper sulfate, copper nitrate, copper acetate and the like can be used as a source of copper. As a source of silicon, for example, silica sol, silicon tetramethoxide, silicon tetraethoxide, silicon tetraisopropoxide, silicon tetrabutoxide and the like can be used. As a source of noble metal, for example, chloroplatinic acid, palladium chloride, palladium nitrate, rhodium nitrate, rhodium chloride, chloroauric acid, iridium chloride and the like can be used. As a source of rare earth element, for example, there can be used lanthanum nitrate, lanthanum chloride, cerium nitrate, cerium chloride, holmium nitrate, holmium chloride, yttrium nitrate, yttrium chloride and the like.

According to the precipitation process, for example, a zeolite carrier is added to an aqueous solution containing a copper source and a silicon source, followed by adding an alkaline aqueous solution thereto, whereby a hydrous compound oxide of copper and silicon is precipitated (as a gel) on the zeolite. Where the noble metal(s) and/or rare earth element(s) are also to be supported on the zeolite carrier, source(s) of the noble metal(s) and/or rare earth element(s) required are preliminarily dissolved in the above-described aqueous solution containing the copper source and the silicon source, so that the noble metal(s) and/or rare earth element(s) are eventually co-precipitated on the zeolite as a gel form hydrous compound oxide together with copper and silicon. Alternatively, the product obtained by depositing the hydrous compound oxide of copper and silicon (in gel form) on the zeolite as described above may be brought into contact with an aqueous solution of the noble metal source(s) and/or rare earth element source(s) (Specifically, the contact may be effected by immersing the product in the aqueous solution or by impregnating the product with the aqueous solution.). After the active components are supported on the zeolite, the zeolite is dried and calcined, whereby the catalyst according to the present invention is obtained. Ordinarily, the calcination may be carried out at a temperature of from 400° to 600° C.

According to the sol-gel process, as the source of silicon, an alkoxide of the metal is ordinarily used. A solution of the copper source in an alcohol and a solution of the silicon alkoxide are mixed, and the mixed solution is added to the zeolite carrier to cause the compound oxide of copper and silicon to be deposited (as a gel) on the zeolite. Where the noble metal(s) and/or rare earth element(s) are to be also supported on the zeolite carrier, the noble metal(s) and/or rare earth element(s) are dissolved in the solution of the copper source in an alcohol, e.g. ethylene glycol, the resulting solution is mixed with the silicon alkoxide solution, and the mixed solution is added to the zeolite carrier, whereby the noble metal(s) and/or rare earth element(s) are deposited together with copper and silicon as a gel form hydrous compound oxide on the zeolite. Alternatively, the product obtained by depositing the compound oxide of copper and silicon (as a gel) on the zeolite as described above may be brought into contact with an aqueous solution of the source(s) of the noble metal(s) and/or rare earth element(s). After the active components are thus deposited on the zeolite, the zeolite is dried and calcined, as in the case of the precipitation process.

The catalyst according to the present invention is not specially restricted in shape or form, and can be used in various shapes and forms. As a preferable example of use, the catalyst of the present invention is used in the form of a coating on a suitable refractory substrate, for example, a monolithic substrate made of cordierite or stainless-steel, which coating is adhered to the substrate with a silica, alumina or other binder.

Where the catalyst of the present invention is prepared by employing the above-described precipitation process or sol-gel process, the active components are supported on the zeolite carrier stably and in a high-dispersion state. Therefore, the catalyst thus obtained exhibits high activity for elimination of nitrogen oxides and excellent high-temperature durability, even in the presence of both oxygen and water vapor.

EXAMPLES

Preparation of Catalyst

Example 1

Fifty (50) g of a zeolite (ZSM-5) having a mole ratio of $SiO_2/Al_2O_3$ of 50 was dispersed in 2 liters of an aqueous solution containing 8.7 g of copper(II) nitrate trihydrate and 24.0 g of colloidal silica ($SiO_2$ content: 20%). While agitating the resulting aqueous dispersion, a 2.5 wt. % aqueous ammonia solution was added dropwise to the dispersion to adjust pH to 7, thereby causing the compound oxide of copper and silicon to precipitate on the zeolite carrier. The solid matter thus obtained was collected by filtration, washed and dried in a dryer at 120° C. for 24 hours. After grinding the dried product, the ground product was subjected to calcination in an electric furnace at 540° C. for 4 hours, to give a desired catalyst (Catalyst A-1). The catalyst thus obtained was found to contain 4.6 wt. % (as metal) of Cu and 4.6 wt. % (as metal) of Si as supported active components.

Example 2

Fifty (50) g of the same kind of zeolite (ZSM-5) as used in Example 1 having a mole ratio of $SiO_2/Al_2O_3$ of 50 was dispersed in a solution of 8.7 g of copper(II) nitrate in 50 g of ethylene glycol, and the resulting dispersion was heated and refluxed at 80° C. in $N_2$. To the resulting solution, 16.5 g of silicon tetraethoxide was added dropwise, followed by heating and refluxing at 80° C. for 2 hours. Then, 14.4 g of distilled water (in terms of number of moles, this amount is 10 times the amount of the silicon tetraethoxide) was added dropwise to the reaction mixture, followed by heating and refluxing at 80° C. for 2 hours, to give a reaction product. The reaction product was filtered and dried in a vacuum dryer at 120° C. for 24 hours. The product thus obtained was ground, and the ground product was calcined in an electric furnace at 540° C. for 4 hours, to give a desired catalyst (Catalyst A-2). The catalyst obtained was found to contain 4.6 wt. % (as metal) of Cu and 4.6 wt. %. (as metal) of Si as supported active components.

Example 3

A desired catalyst (Catalyst A-3) was obtained in the same manner as in Example 1, except that an aqueous solution containing 4.4 g of copper(II) nitrate trihydrate and 48.1 g of colloidal silica ($SiO_2$ content: 20%) was used as the solution for dispersing zeolite therein. The catalyst obtained was found to contain 2.3 wt. % (as metal) of Cu and 8.0 wt. % (as metal) of Si as supported active components.

Example 4

A desired catalyst (Catalyst A-4) was obtained in the same manner as in Example 1, except that an aqueous solution containing 13.5 g of copper(II) nitrate trihydrate and 16.0 g of colloidal silica ($SiO_2$ content: 20%) was used as the solution for dispersing zeolite therein. The catalyst obtained was found to contain 7.0 wt. % (as metal) of Cu and 3.0 wt. % (as metal) of Si.

Example 5

A desired catalyst (Catalyst A-5) was obtained in the same manner as in Example 1, except that in place of the zeolite having the $SiO_2/Al_2O_3$ mole ratio of 50, a zeolite (ZSM-5) with a corresponding mole ratio of 140 was used in an amount of 50 g. The catalyst obtained was found to contain 4.6 wt. % (as metal) of Cu and 4.6 wt. % (as metal) of Si as supported active components.

Example 6

A desired catalyst (Catalyst A-6) was obtained in the same manner as in Example 1, except that in place of the zeolite having the $SiO_2/Al_2O_3$ mole ratio of 50, a zeolite (ZSM-5) with a corresponding mole ratio of 30 was used in an amount of 50 g. The catalyst obtained was found to contain 4.6 wt. % (as metal) of Cu and 4.6 wt. % (as metal) of Si as supported active components.

Example 7

A desired catalyst (Catalyst A-7) was obtained in the same manner as in Example 1, except that an aqueous solution containing 3.1 g of cerium(III) nitrate hexahydrate in addition to 8.7 g of copper(II) nitrate trihydrate and 24.0 g of colloidal silica ($SiO_2$ content: 20%) was used as the solution for dispersing zeolite therein. The catalyst obtained was found to contain 4.6 wt. % (as metal) of Cu, 4.6 wt. % (as metal) of Si and 2.0 wt. % (as metal) of Ce as supported active components.

Example 8

A desired catalyst (Catalyst A-8) was obtained in the same manner as in Example 1, except that an aqueous solution containing 6.2 g of copper(II) chloride dihydrate, 26.0 g of silicon tetramethoxide and 4.0 g of lanthanum chloride heptahydrate was used as the solution for dispersing zeolite therein. The catalyst obtained was found to contain 4.6 wt. % (as metal) of Cu, 4.6 wt. % (as metal) of Si and 2.5 wt. % (as metal) of La as supported active components.

Example 9

Fifty (50) g of a zeolite (ZSM-5) having an $SiO_2/Al_2O_3$ mole ratio of 50 was dispersed in 2 liters of an aqueous solution containing 4.4 g of copper(II) nitrate trihydrate and 26.0 g of silicon tetraethoxide. While agitating the resulting dispersion, a 2.5 wt. % aqueous ammonia solution was added dropwise to the dispersion to adjust pH to 7, thereby causing the precipitation of a compound oxide of Cu and Si on the zeolite carrier. The solid matter thus precipitated was collected by filtration, washed and dried in a dryer at 120° C. for 24 hours. After grinding the dried product, the ground product was immersed in 1 liter of an aqueous solution containing 1.5 g of chloroplatinic acid ($H_2PtCl_6$), and after agitating the reaction system for 3 hours, the reaction product was subjected to filtration, washing and drying in a dryer at 120° C. for 24 hours. The product thus obtained was ground, and the ground product was calcined in an electric furnace at 540° C. for 4 hours, to give a desired catalyst (Catalyst A-9). The catalyst obtained was found to contain 2.3 wt. % (as metal) of Cu, 7.0 wt. % (as metal) of Si and 0.5 wt. % (as metal) of Pt as supported active components.

Example 10

Fifty (50) g of a zeolite (ZSM-5) having an $SiO_2/Al_2O_3$ mole ratio of 50 was dispersed in 2 liters of an aqueous solution containing 6.2 g of copper(II) chloride dihydrate and 24.0 g of colloidal silica ($SiO_2$ content: 20%). While agitating the resulting dispersion, a 2.5 wt. % aqueous ammonia solution was added dropwise to the dispersion to adjust pH to 7, thereby causing the precipitation of a compound oxide of Cu and Si on the zeolite carrier. The solid matter thus obtained was collected by filtration, washed and dried in a dryer at 120° C. for 24 hours. After grinding the solid matter thus obtained, the ground product was immersed in 1 liter of an aqueous solution containing 1.0 g of chloroauric acid ($HAuCl_4$). After the reaction mixture was agitated for 3 hours, the reaction product was filtered, washed and dried in a dryer at 120° C. for 24 hours. The dried product thus obtained was ground, and the ground product was calcined in an electric furnace at 540° C. for 4 hours, to give a desired catalyst (Catalyst A-10). The catalyst obtained was found to contain 4.5 wt. % (as metal) of Cu, 4.6 wt. % (as metal) of Si and 1.0 wt. % (as metal) of Au as supported active components.

Example 11

A desired catalyst (Catalyst A-11) was obtained in the same manner as in Example 2, except that a solution of 8.7 g of copper(II) nitrate trihydrate and 0.7 g of holmium nitrate trihydrate in 50 g of ethylene glycol was used as the solution for dispersing zeolite therein. The catalyst obtained was found to contain 4.6 wt. % (as metal) of Cu, 4.6 wt. % (as metal) of Si and 0.5 wt. % (as metal) of Ho as supported active components.

Example 12

A desired catalyst (Catalyst A-12) was obtained in the same manner as in Example 1, except that an aqueous solution containing 8.7 g of copper(II) nitrate trihydrate, 26.0 g of silicon tetraethoxide, 1.0 g of chloroplatinic acid ($H_2PtCl_6$) and 3.1 g of cerium(III) nitrate hexahydrate was used as the solution for dispersing zeolite therein. The catalyst obtained was found to contain 4.6 wt. % (as metal) of Cu, 4.6 wt. % (as metal) of Si, 0.5 wt. % (as metal) of Pt and 2.0 wt. % (as metal) of Ce as supported active components.

Example 13

A desired catalyst (Catalyst A-13) was obtained in the same manner as in Example 1, except that in place of the zeolite having the $SiO_2/Al_2O_3$ mole ratio of 50, mordenite (product name: TSZ-640NAA, produced by Tosoh Corp.) with a corresponding mole ratio of 20 was used in an amount of 50 g. The catalyst obtained was found to contain 4.6 wt. % (as metal) of Cu and 4.6 wt. % (as metal) of Si as supported active components.

Comparative Example 1

Fifty (50) g of a zeolite (ZSM-5) having an $SiO_2/Al_2O_3$ mole ratio of 50 was dispersed in 2 liter of an aqueous solution containing 20 g of copper(II) acetate monohydrate, followed by agitation at 50° C. for 5 hours to effect ion-exchange with copper. After the ion-exchange, the solid matter was collected by filtration, washed and dried in a dryer at 120° C. for 24 hours. The dried product was ground, and the ground product was calcined in an electric furnace at 540° C. for 4 hours, to give an aimed catalyst (Catalyst B-1). The catalyst obtained was found to contain 3.5 wt. % (as metal) of Cu as a supported active component.

Comparative Example 2

An aimed catalyst (Catalyst B-2) was obtained in the same manner as in Example 1, except that an aqueous solution containing 8.7 g of copper(II) nitrate trihydrate only was used as the solution for dispersing zeolite therein. The catalyst obtained was found to contain 4.6 wt. % (as metal) of Cu as a supported active component.

Comparative Example 3

An aimed catalyst (Catalyst B-3) was obtained in the same manner as in Example 1, except that an aqueous solution containing 24.0 g of colloidal silica ($SiO_2$ content: 20%) only was used as the solution for dispersing zeolite therein. The catalyst obtained was found to contain 4.6 wt. % (as metal) of Cu as a supported active component.

Comparative Example 4

While 2 liter of an aqueous solution containing 87.0 g of copper(II) nitrate trihydrate and 240.0 g of colloidal silica ($SiO_2$ content: 20%) was agitated, a 2.5 wt. % aqueous ammonia solution was added dropwise to the agitated solution to adjust pH to 7, thereby causing a compound oxide of Cu and Si to precipitate. The solid matter thus precipitated was collected by filtration, washed and then dried in a dryer at 120° C. for 24 hours. The dried product obtained was ground, and the ground product was calcined in an electric furnace at 540° C. for 4 hours, to give an aimed catalyst (Catalyst B-4). The catalyst thus obtained was found to contain 30 wt. % (as metal) of Cu and 30 wt. % (as metal) of Si as active components.

Comparative Example 5

An aimed catalyst (Catalyst B-5) was obtained in the same manner as in Comparative Example 1, except that an aqueous solution containing 20 g of copper(II) acetate monohydrate and 3.0 g of $Pt(NH_3)_4Cl_2$ was used as the solution for dispersing zeolite therein. The catalyst thus obtained was found to contain 4.0 wt. % (as metal) of Cu and 0.5 wt. % (as metal) of Pt as supported active components.

Comparative Example 6

An aimed catalyst (Catalyst B-6) was obtained in the same manner as in Comparative Example 1, except that an aqueous solution containing 20 g of copper(II) acetate monohydrate and 8.0 g of cerium(III) nitrate hexahydrate was used as the solution for dispersing zeolite therein. The catalyst thus obtained was found to contain 3.4 wt. % (as metal) of Cu and 1.8 wt. % (as metal) of Ce as supported active components.

Comparative Example 7

An aimed catalyst (Catalyst B-7) was obtained in the same manner as in Comparative Example 1, except that an aqueous solution containing 20 g of copper(II) acetate monohydrate, 3.0 g of $Pt(NH_3)_4Cl_2$ and 8.0 g of cerium(III) nitrate hexahydrate was used as the solution for dispersing zeolite therein. The catalyst thus obtained was found to contain 3.2 wt. % (as metal) of Cu, 1.3 wt. % (as metal) of Ce and 0.7 wt. % (as metal) of Pt as supported active components.

Comparative Example 8

An aimed catalyst (Catalyst B-8) was obtained in the same manner as in Example 1, except that in place of the zeolite having the $SiO_2/Al_2O_3$ mole ratio of 50, a zeolite (ZSM-5) with a corresponding mole ratio of 15 was used in an amount of 50 g. The catalyst thus obtained was found to contain 4.6 wt. % (as metal) of Cu and 4.6 wt. % (as metal) of Si as supported active components.

cl Comparative Example 9

An aimed catalyst (Catalyst B-9) was obtained in the same manner as in Example 1, except that in place of the zeolite having the $SiO_2/Al_2O_3$ mole ratio of 50, a zeolite (ZSM-5) with a corresponding mole ratio of 500 was used in an amount of 50 g. The catalyst thus obtained was found to contain 4.6 wt. % (as metal) of Cu and 4.6 wt. % (as metal) of Si as supported active components.

Evaluation of catalyst

The catalysts A-1 to A-13 and B-1 to B-9 obtained respectively in Examples 1 to 13 and Comparative Examples 1 to 9 above were each subjected to wet grinding in a ball mill, together with a mixed solution of colloidal silica and distilled water, to give a slurry. In each of the slurries thus obtained, a commercial 400-cpsi (cells per square inch) cordierite honeycomb substrate having a diameter of 1 in. and a length of 1.5 in. was immersed. After taking out the honeycomb substrate from the slurry, excess slurry was removed by an air knife so that the amount of catalyst on the substrate would be 100 g/l, followed by drying and calcination, to obtain a honeycomb-supported catalyst.

(a) Evaluation of catalytic activity

The honeycomb-supported catalysts obtained as above were subjected to evaluation of their performance in eliminating nitrogen oxides from a test gas having the following composition, under the evaluation test conditions set forth below.

(1) Gas composition:

| (1) Gas composition: | NO | 1,200 (ppm) |
|---|---|---|
| | $O_2$ | 3.2 (%) |
| | CO | 3,000 (ppm) |
| | $C_3H_6$ | 1,600 (ppm) |
| | $H_2$ | 1,000 (ppm) |
| | $CO_2$ | 10.0 (%) |
| | $H_2O$ | 10.0 (%) |
| | $N_2$ | balance |
| (2) Space velocity (SV): | | 100,000 $(hr^{-1})$ |
| (3) Reaction temperature: | | 400° C. and 500° C. |

(2) Space velocity (SV): 100,000 $(hr^{-1})$ (3) Reaction temperature: 400° C. and 500° C.

(b) Evaluation of high-temperature durability

After the honeycomb-supported catalysts were aged for 5 hours at 700° C. under the stream of air containing 10% of water vapor, measurement of catalytic activity was carried out in the same manner as above.

The results for the catalysts obtained in Examples above are given in Table 1, and the results for the catalysts obtained in Comparative Examples are set forth in Table 2.

TABLE 1

(Examples)

| | Conversion of NO (%) | | | | | Conversion of NO (%) | | | |
|---|---|---|---|---|---|---|---|---|---|
| | In the initial stage | | After durability test | | | In the initial stage | | After durability test | |
| Catalyst | 400° C. | 500° C. | 400° C. | 500° C. | Catalyst | 400° C. | 500° C. | 400° C. | 500° C. |
| A-1 | 51 | 45 | 9 | 32 | A-8 | 47 | 47 | 24 | 31 |
| A-2 | 64 | 61 | 18 | 41 | A-9 | 51 | 52 | 20 | 32 |
| A-3 | 49 | 44 | 10 | 30 | A-10 | 55 | 50 | 18 | 38 |
| A-4 | 50 | 41 | 8 | 27 | A-11 | 67 | 61 | 22 | 43 |
| A-5 | 18 | 29 | 8 | 19 | A-12 | 50 | 50 | 26 | 36 |
| A-6 | 25 | 34 | 5 | 21 | A-13 | 44 | 38 | 5 | 24 |
| A-7 | 53 | 51 | 17 | 36 | | | | | |

TABLE 2

(Comparative Examples)

| | Conversion of NO (%) | | | | | Conversion of NO (%) | | | |
|---|---|---|---|---|---|---|---|---|---|
| | In the initial stage | | After durability test | | | In the initial stage | | After durability test | |
| Catalyst | 400° C. | 500° C. | 400° C. | 500° C. | Catalyst | 400° C. | 500° C. | 400° C. | 500° C. |
| B-1 | 12 | 45 | 3 | 14 | B-6 | 19 | 42 | 6 | 17 |
| B-2 | 9 | 37 | 0 | 9 | B-7 | 27 | 33 | 7 | 15 |
| B-3 | 0 | 0 | 0 | 0 | B-8 | 0 | 11 | 0 | 3 |
| B-4 | 0 | 0 | 0 | 0 | B-9 | 0 | 0 | 0 | 0 |
| B-5 | 31 | 38 | 7 | 13 | | | | | |

The results given in Tables 1 and 2 show that the catalysts according to the present invention are by far superior in performance in eliminating nitrogen oxides and high-temperature durability, as compared with those conventional catalysts in which copper or the like is supported on zeolite by ion-exchange technique.

Besides, the results obtained with the catalysts B-2 to B-4 of Comparative Examples 2 to 4 and with the catalysts B-8 and B-9 of Comparative Examples 8 and 9 show that the catalysts in which only one of copper and silicon is supported on zeolite by the precipitation process, the catalysts in which zeolite is not used as carrier, and the catalysts in which the zeolite used as carrier does not have an $SiO_2/Al_2O_3$ mole ratio in the range from 20 to 200, are all inferior to the catalysts of the present invention in both nitrogen-oxide elimination performance and high-temperature durability.

Furthermore, it is also seen from the evaluation results that the catalysts of the present invention in which a noble metal and/or a rare earth element is additionally supported on the zeolite carrier show further improvements in activity and high-temperature durability.

We claim:

1. A catalyst for purifying exhaust gas, comprising a zeolite carrier having a mole ratio of $SiO_2/Al_2O_3$ of from 20 to 200, and a compound oxide of copper and silicon supported on the carrier.

2. The catalyst according to claim 1, wherein the compound oxide is contained in an amount such that the total amount of copper and silicon is from 2 to 30% by weight, based on the whole catalyst.

3. The catalyst according to claim 1, wherein the compound oxide has a weight ratio of Cu/Si, on a metallic basis, in the range from 0.1 to 5.

4. The catalyst according to claim 1, wherein copper is present in an amount of from 1.0 to 15% by weight, as metallic copper, based on the whole catalyst, and silicon is present in an amount of from 1.0 to 15% by weight, as metallic silicon, based on the whole catalyst.

5. The catalyst according to claim 1, further comprising at least one noble metal selected from the group consisting of Pt, Pd, Rh, Au and Ir.

6. The catalyst according to claim 5, wherein the amount of the noble metal component is from 0.05 to 5% by weight, as metal, based on the whole catalyst.

7. The catalyst according to claim 5, wherein the noble metal component is highly dispersed in the compound oxide of copper and silicon, in a metallic state.

8. The catalyst according to claim 1, further comprising an oxide of at least one rare earth element selected from the group consisting of La, Ce, Ho and Y.

9. The catalyst according to claim 8, wherein the amount of the rare earth component is from 0.05 to 10% by weight, as rare earth element(s), based on the whole catalyst.

10. The catalyst according to claim 1, which is in the form of a coating on a refractory substrate.

* * * * *